US012458564B2

(12) United States Patent
Huang

(10) Patent No.: US 12,458,564 B2
(45) Date of Patent: Nov. 4, 2025

(54) MASSAGE DEVICE WITH REPLACEABLE MASSAGE SUBASSEMBLIES

(71) Applicant: Shenzhen Alltokee Technology Co., Ltd, Shenzhen (CN)

(72) Inventor: Minyi Huang, Lianping (CN)

(73) Assignee: Shenzhen Alltokee Technology Co., Ltd, Shenzhen (CN)

( * ) Notice: Subject to any disclaimer, the term of this patent is extended or adjusted under 35 U.S.C. 154(b) by 955 days.

(21) Appl. No.: 17/584,410

(22) Filed: Jan. 26, 2022

(65) Prior Publication Data

US 2022/0142855 A1 May 12, 2022

(51) Int. Cl.
*A61H 23/02* (2006.01)

(52) U.S. Cl.
CPC ..... *A61H 23/02* (2013.01); *A61H 2201/0107* (2013.01); *A61H 2201/0207* (2013.01); *A61H 2201/1664* (2013.01)

(58) Field of Classification Search
CPC .................... A61H 23/02; A61H 23/00; A61H 2201/0107; A61H 2201/0207; A61H 2201/1664; A61H 2201/16; A61H 2201/1657; A61H 19/00; A61H 19/30; A61H 19/34; A61H 19/50; A61H 19/40; A61H 19/44; A61H 23/0254; A61H 23/0263; A61H 2023/0272; A61H 2023/0281; A61H 21/00; A61H 2205/087; A61H 7/004; A61H 7/005; A61H 15/0078; A61H 15/0085; A61H 2201/0153; A61H 2201/0161; A61H 2201/1685
See application file for complete search history.

(56) References Cited

U.S. PATENT DOCUMENTS

| | | | | |
|---|---|---|---|---|
| 7,160,261 | B1 * | 1/2007 | Huang | A61H 15/0078 601/103 |
| 8,915,835 | B2 * | 12/2014 | Lee | A61H 19/34 600/38 |
| 9,114,056 | B2 * | 8/2015 | Imboden | A61H 23/0218 |
| 9,265,689 | B2 * | 2/2016 | Stanbridge | A61H 23/0254 |
| 9,610,214 | B2 * | 4/2017 | Zipper | A61H 23/00 |
| 9,872,813 | B2 * | 1/2018 | Giraud | A61H 7/005 |

(Continued)

*Primary Examiner* — Timothy A Stanis
*Assistant Examiner* — Tyler A Raubenstraw
(74) *Attorney, Agent, or Firm* — Hemisphere Law, PLLC; Zhigang Ma

(57) ABSTRACT

The present disclosure discloses a massage device with replaceable massage subassemblies, including a stick body and at least one massage subassembly. A printed circuit board (PCB), a first massage module, and a power supply are arranged in the stick body. The PCB is electrically connected to the first massage module and the power supply. A second massage module is arranged in each massage subassembly. The stick body is provided with a conducting sliding rail, and the PCB is electrically connected to the conducting sliding rail. Each massage subassembly is provided with a conducting sheet adapting to the conducting sliding rail. The conducting sheet is capable of sliding in a reciprocating manner on the conducting sliding rail. Therefore, by means of configuring several massage subassemblies, each massage subassembly has a different massage function, so that a user can replace massage subassemblies to achieve different massage modes.

10 Claims, 8 Drawing Sheets

(56) References Cited

U.S. PATENT DOCUMENTS

| | | | | |
|---|---|---|---|---|
| 10,350,135 | B2 * | 7/2019 | Sedic | A61H 19/44 |
| 2002/0107459 | A1 * | 8/2002 | Chang | A61H 7/005 601/97 |
| 2002/0188233 | A1 * | 12/2002 | Denyes | A61H 19/44 601/DIG. 16 |
| 2006/0141903 | A1 * | 6/2006 | Gardos | A61H 19/44 446/490 |
| 2011/0009783 | A1 * | 1/2011 | Dverin | A61B 18/14 606/33 |
| 2012/0095376 | A1 | 4/2012 | Ishikawa et al. | |
| 2012/0123199 | A1 * | 5/2012 | Topolev | A61H 19/34 600/38 |
| 2013/0030336 | A1 | 1/2013 | Chen | |
| 2017/0079865 | A1 * | 3/2017 | Kao | A61H 1/008 |
| 2018/0049938 | A1 * | 2/2018 | Fleming | A47G 9/1081 |
| 2018/0263844 | A1 * | 9/2018 | Schoon | A61H 23/02 |
| 2018/0264205 | A1 * | 9/2018 | Lorberbaum | A61M 5/422 |
| 2018/0303703 | A1 | 10/2018 | Biedermann | |
| 2019/0142692 | A1 * | 5/2019 | Becse | A61N 1/36003 607/3 |
| 2019/0175440 | A1 * | 6/2019 | Lee | A61H 23/02 |
| 2019/0350793 | A1 * | 11/2019 | Wersland | A61H 23/006 |
| 2020/0085679 | A1 * | 3/2020 | Haddock | A61H 19/44 |
| 2020/0085680 | A1 * | 3/2020 | Haddock | A61H 21/00 |
| 2020/0155410 | A1 * | 5/2020 | Smith, Jr. | A61H 7/001 |
| 2020/0163826 | A1 * | 5/2020 | Topolev | A61H 23/0218 |
| 2021/0338523 | A1 * | 11/2021 | Zheng | A61H 19/44 |
| 2022/0151865 | A1 * | 5/2022 | Hu | A61H 23/02 |
| 2022/0160578 | A1 * | 5/2022 | Curley | A61H 23/02 |
| 2023/0024137 | A1 * | 1/2023 | Larkin | A61H 19/44 |
| 2023/0116215 | A1 * | 4/2023 | Liu | A61H 9/0057 600/38 |
| 2023/0127737 | A1 * | 4/2023 | Raccah | A61H 23/02 600/38 |

* cited by examiner

MASSAGE DEVICE WITH REPLACEABLE MASSAGE SUBASSEMBLIES

TECHNICAL FIELD

The present disclosure relates to the field of massage devices, in particular to a massage device with replaceable massage subassemblies.

BACKGROUND ART

An existing massage device has a first massage module and a second massage module which are used for massaging different parts of a human body. However, in the existing massage device, a carrier for installing the first massage module and a carrier for installing the second massage device are integrated, so that the function of the massage device is fixed and cannot meet the needs of most users. In addition, the integrated design cannot adjust a relative position between the second massage module and the first massage module and cannot adapt to different physical differences of users.

Therefore, it is necessary to study a new technical solution to solve the above problems.

SUMMARY

In order to solve the defects and deficiencies in the above prior art, the present disclosure provides a massage device with replaceable massage subassemblies. By means of configuring several massage subassemblies, each massage subassembly has a different massage function, so that a user can replace different massage subassemblies to achieve different massage modes. At the same time, a conducting sliding rail is used to cause the massage subassembly to be adjustably disposed on a stick body, so that a length from a front end of the stick body to the massage subassembly can be changed by sliding the massage subassembly to meet usage needs of different users.

In order to achieve the above-mentioned objectives, the present disclosure adopts the following technical solutions: a massage device with replaceable massage subassemblies, including a stick body and at least one massage subassembly arranged on the stick body in a separating manner.

A printed circuit board (PCB), a first massage module, and a power supply are arranged in the stick body. The PCB is electrically connected to the first massage module and the power supply. A second massage module is arranged in each massage subassembly.

The stick body is provided with a conducting sliding rail disposed in a lengthwise direction of the stick body, and the PCB is electrically connected to the conducting sliding rail.

Each massage subassembly is provided with a conducting sheet adapting to the conducting sliding rail, and the conducting sheet is electrically connected to the second massage module; and the conducting sheet is capable of sliding in a reciprocating manner on the conducting sliding rail.

As one preferable solution, the massage subassembly has a connecting through hole adapting to the stick body. An inner side surface of the connecting through hole has a first silica gel layer. An outer side surface of the stick body is provided with a second silica gel layer. When the massage subassembly is arranged on the stick body, the first silica gel layer and the second silica gel layer are in contact with each other.

As one preferable solution, two conducting sliding rails are provided, which are respectively defined as a first conducting sliding rail and a second conducting sliding rail. Further, the first conducting sliding rail and the second conducting sliding rail are arranged on an outer circumferential side of the stick body in a spacing manner.

Correspondingly, two conducting sheets are provided, which are respectively defined as a first conducting sheet and a second conducting sheet. Further, the first conducting sheet and the second conducting sheet are arranged on an inner circumferential side of the connecting through hole in a spacing manner. During assembling, the first conducting sheet is in contact connection with the first conducting sliding rail, and the second conducting sheet is in contact connection with the second conducting sliding rail.

As one preferable solution, the conducting sliding rail has a connecting recess that is recessed towards the inner side, and the conducting sheet has a connecting protrusion adapting to the connecting recess.

As one preferable solution, the stick body includes a plastic inner housing and a silica gel outer sleeve. The silica gel outer sleeve is sleeved on the outer side of the plastic inner housing.

Further, the plastic inner housing has an accommodating cavity, and the PCB, the battery, and the first massage module are all arranged in the accommodating cavity.

The second silica gel layer is formed on the silica gel outer sleeve.

As one preferable solution, the plastic inner housing is provided with a mounting slot used for mounting the conducting sliding rail, and a position of the silica gel outer sleeve corresponding to the mounting slot is provided with an avoiding slot.

As one preferable solution, the PCB is electrically connected with a control button.

As one preferable solution, the first massage module includes a first vibration module, and the first vibration module has a first vibration motor.

As one preferable solution, the first massage module further includes a heating module used for heating the stick body.

As one preferable solution, the second massage module includes a second vibration module, and the second vibration module has a second vibration motor.

Compared with the prior art, the present disclosure has obvious advantages and beneficial effects. Specifically, it can be seen from the above-mentioned technical solutions that the main advantages are that by means of configuring several massage subassemblies, each massage subassembly has a different massage function, so that a user can replace different massage subassemblies to achieve different massage modes. At the same time, the conducting sliding rail is used to cause the massage subassembly to be adjustably disposed on the stick body, so that a length from a front end of the stick body to the massage subassembly can be changed by sliding the massage subassembly to meet usage needs of different users.

Secondly, the ingenious design of the conducting sliding rails and the conducting sheets can maintain effective connection between the massage subassemblies and the PCB. At the same time, by the corresponding arrangement of the first silica gel layer and the second silica gel layer, the working stability of the massage subassemblies and the stick body is well guaranteed.

In order to describe the structural features and effects of the present disclosure more clearly, the present disclosure is described in detail below in combination with the accompanying drawings and specific embodiments.

Figure 1:
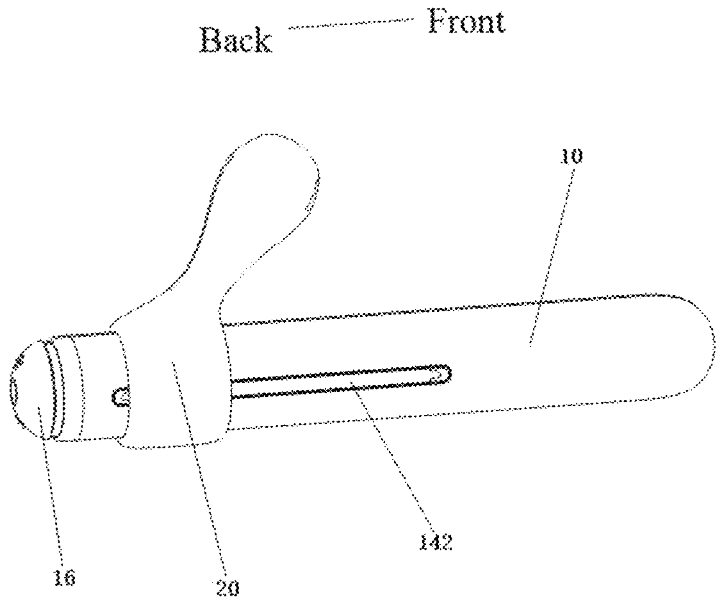
FIG. 1 is a schematic diagram of application of an embodiment of the present disclosure.

Reference signs in the drawings:

10: stick body; 101: first inner housing; 102: second inner housing; 103: silica gel outer sleeve; 11: PCB; 12: first massage module; 13: power supply; 141: first conducting sliding rail; 142: second conducting sliding rail; 143: connecting recess; 15: second silica gel layer; 16: button cap; 20: massage subassembly; 21: second massage module; 221: first conducting sheet; 222: second conducting sheet; 223: connecting protrusion; 23: connecting through hole; 24: first silica gel layer.

DETAILED DESCRIPTION OF THE EMBODIMENTS

The technical solutions in the embodiments of the present disclosure will be clearly and completely described below in conjunction with the accompanying drawings. Apparently, the described embodiments are only preferred embodiments of the present disclosure.

It should be noted that when an element is referred to as being "fixed" to another element, it can be directly on the other element or an intermediate element may also exist. When an element is considered to be "connected" to another element, it can be directly connected to the other element or an intermediate element may be present at the same time. The terms "perpendicular", "horizontal", "left", "right" and similar expressions used herein are for illustrative purposes only, and are not meant to be the only implementation modes.

Unless otherwise defined, all technical and scientific terms used herein are the same as meanings of general understandings of those skilled in the art of the disclosure. The terms used in the description of the present disclosure herein are merely to describe the specific implementation modes, not intended to limit the present disclosure. The term "and/or" used herein includes any and all combinations of one or more related listed items.

Figure 2:
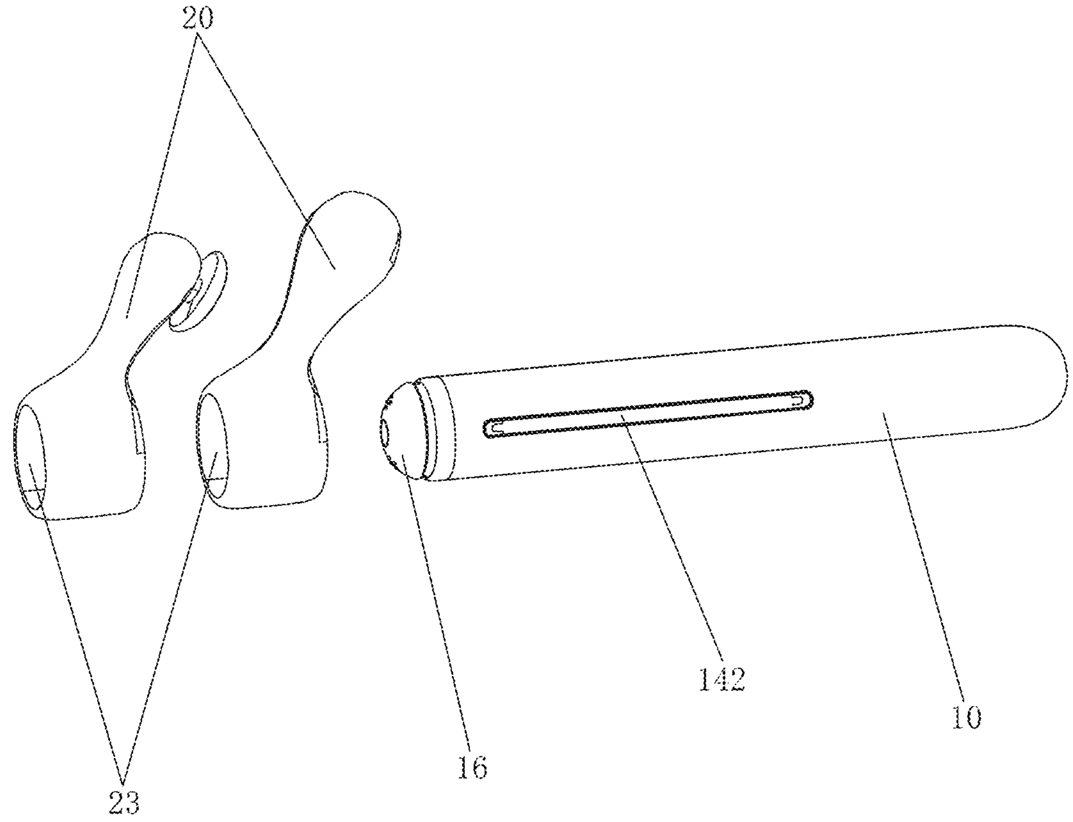
FIG. 2 is a first schematic exploded diagram of an embodiment of the present disclosure.
Figure 3:
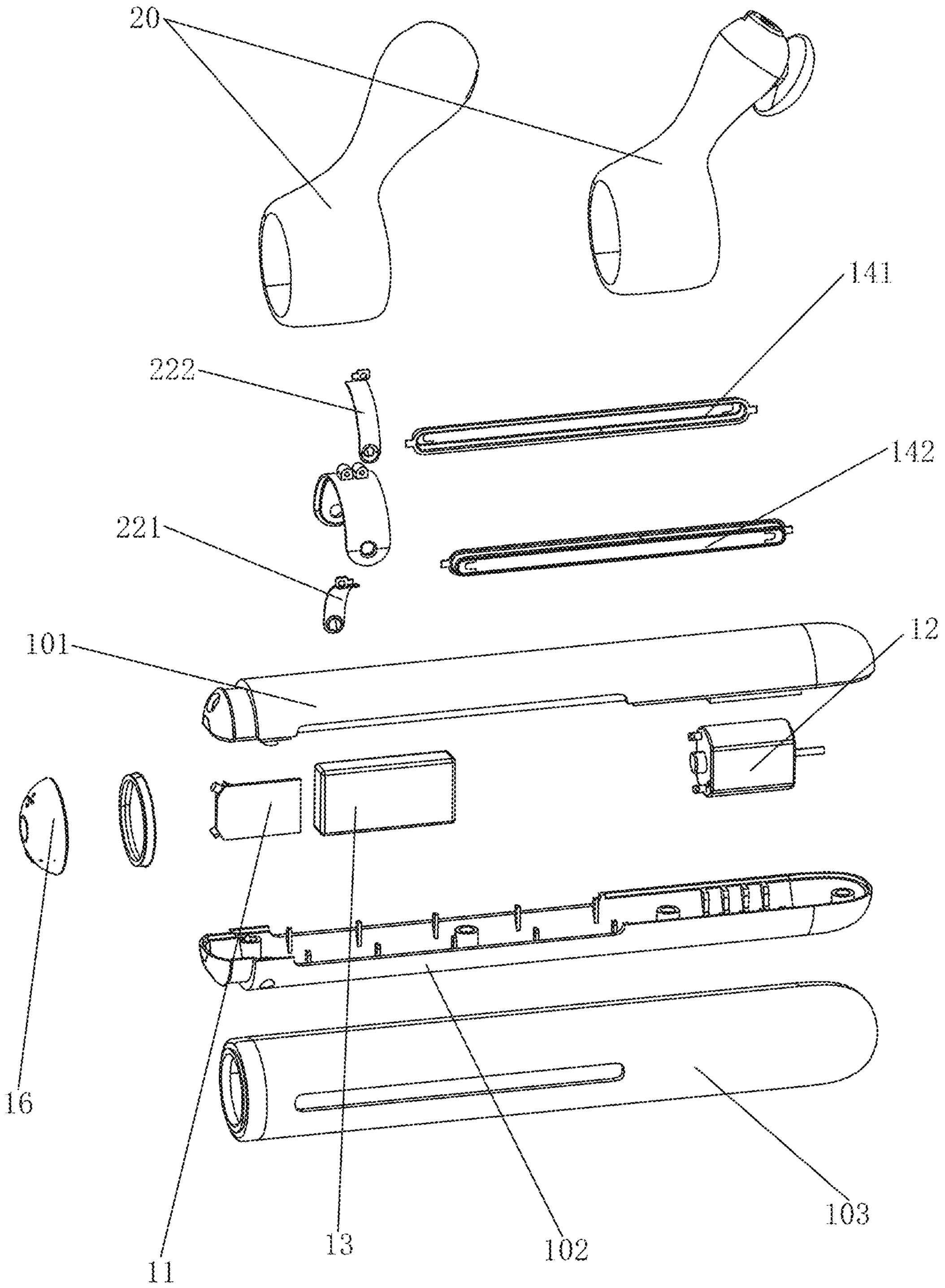
FIG. 3 is a second schematic exploded diagram of an embodiment of the present disclosure.
Figure 4:
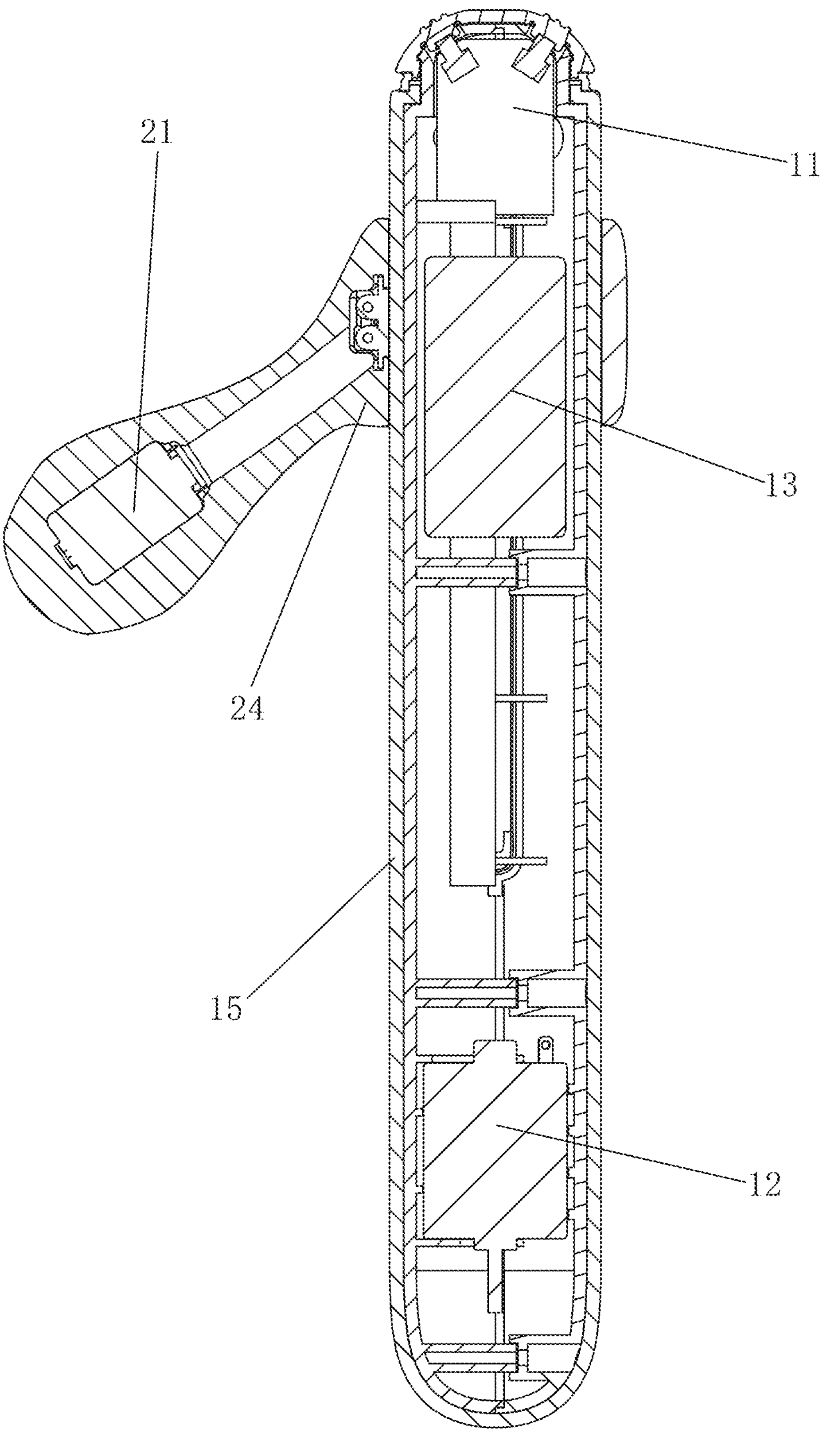
FIG. 4 is a first schematic sectional diagram of an embodiment of the present disclosure.
Figure 5:
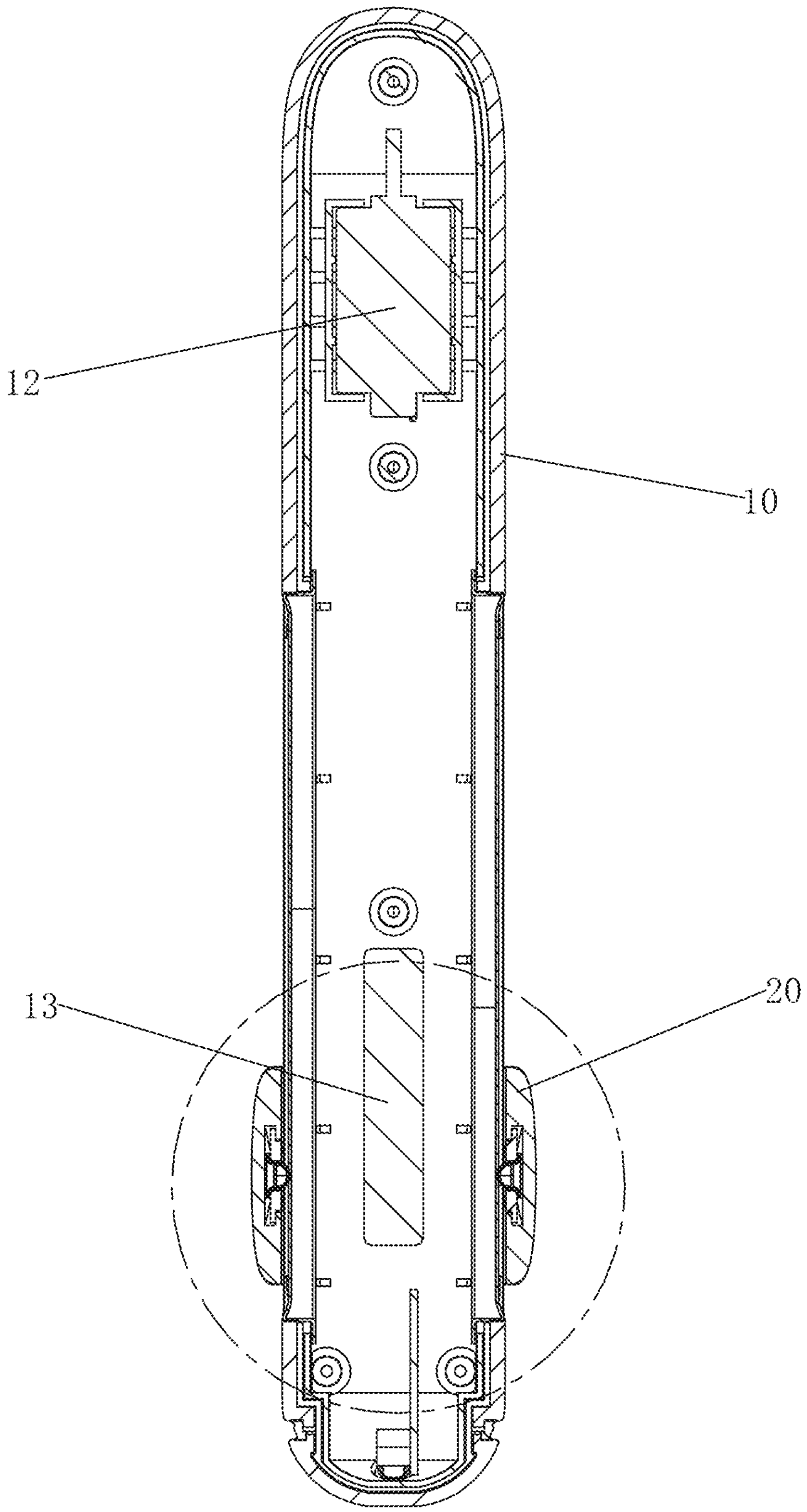
FIG. 5 is a second schematic sectional diagram of an embodiment of the present disclosure.
Figure 6:
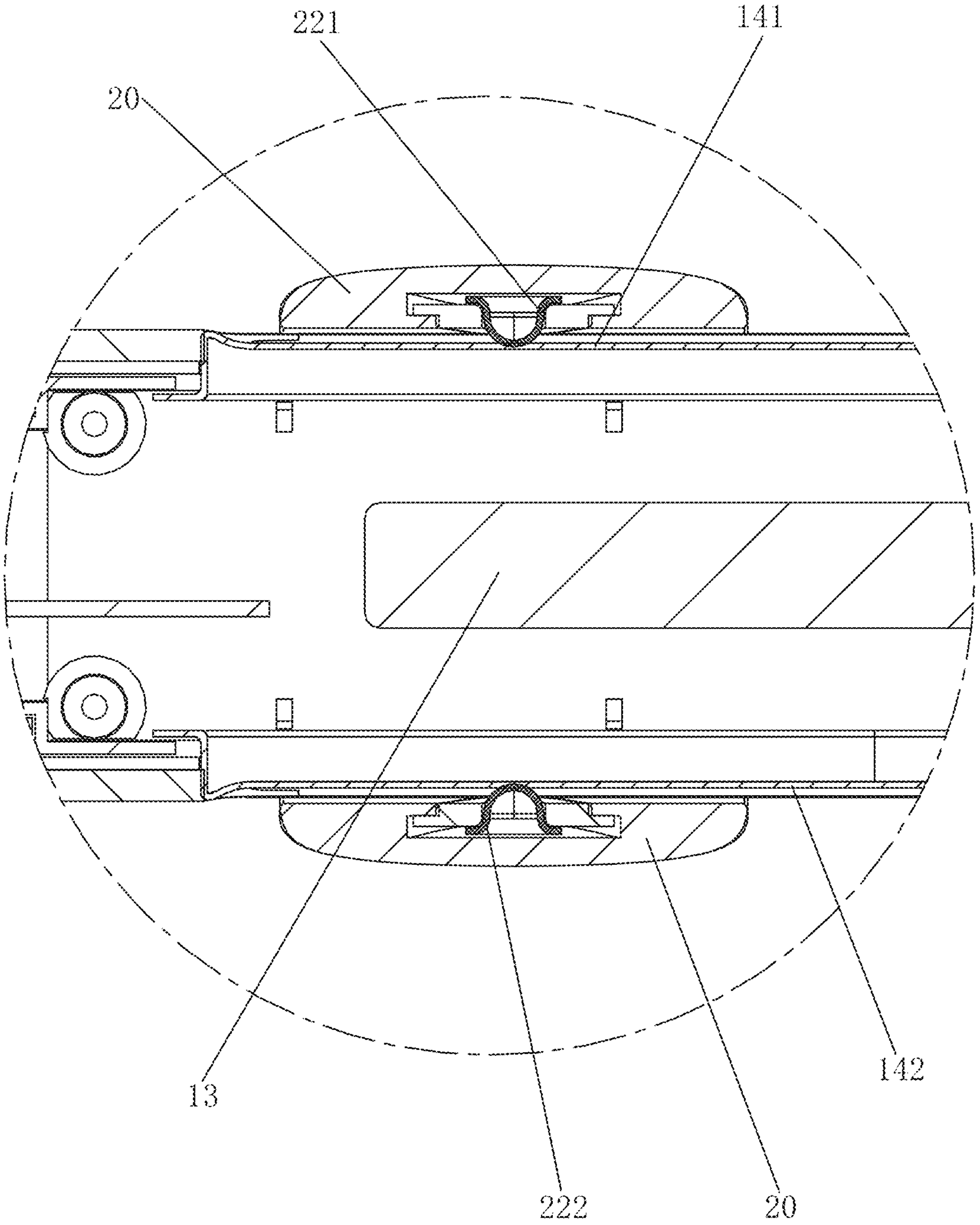
FIG. 6 is a partially enlarged diagram of FIG. 5.
Figure 7:
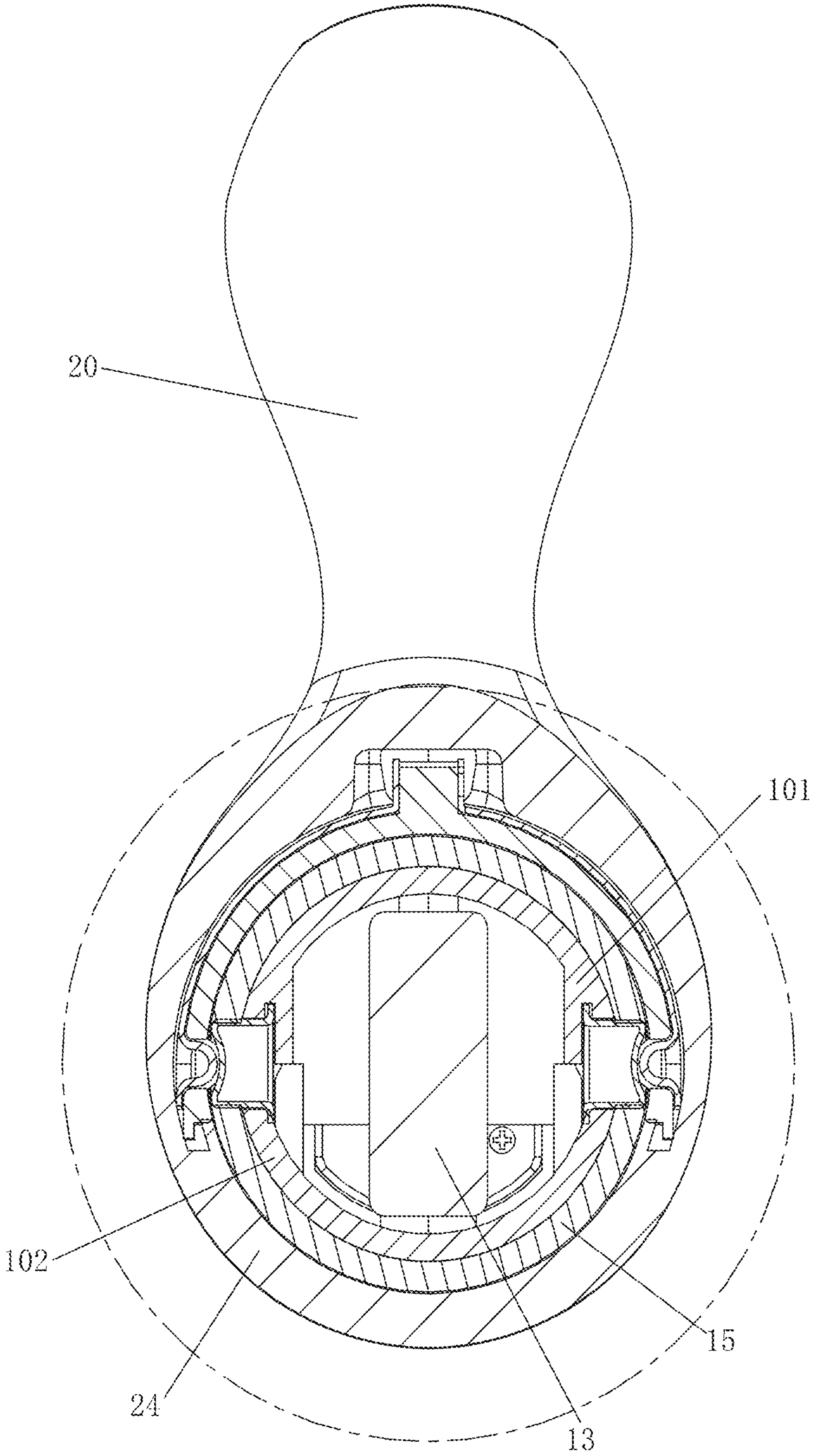
FIG. 7 is a third schematic sectional diagram of an embodiment of the present disclosure.
Figure 8:
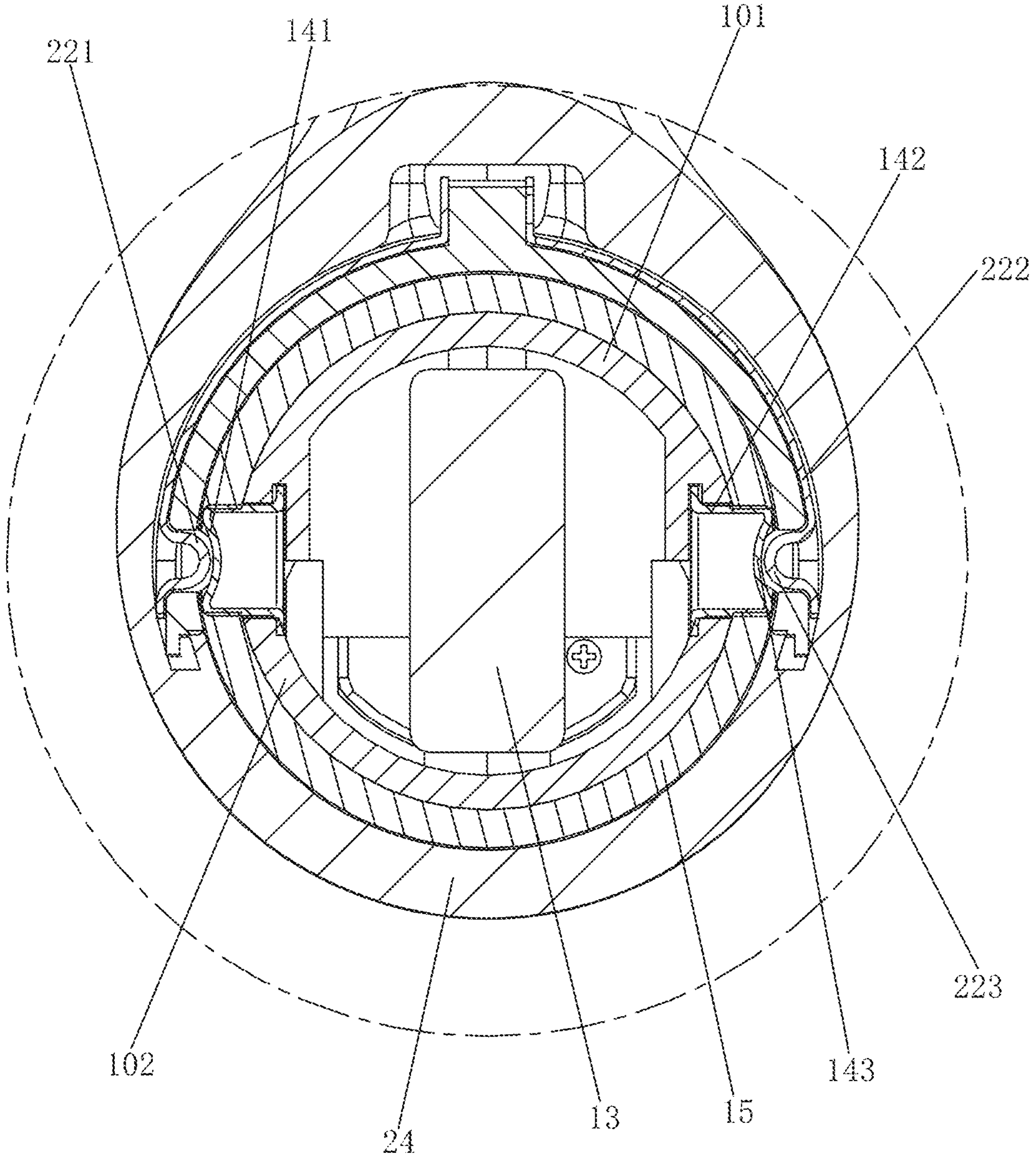
FIG. 8 is a partially enlarged diagram of FIG. 7.

Referring to FIG. 1 to FIG. 8, a massage device with replaceable massage subassemblies 20 in an embodiment of the present disclosure includes a stick body 10 and at least one massage subassembly 20 arranged on the stick body 10 in a separating manner.

A PCB 11, a first massage module 12, and a power supply 13 are arranged in the stick body 10. The PCB 11 is electrically connected to the first massage module 12 and the power supply 13. A second massage module 21 is arranged in each massage subassembly 20.

The stick body 10 is provided with a conducting sliding rail disposed in a lengthwise direction of the stick body 10, and the PCB 11 is electrically connected to the conducting sliding rail.

Each massage subassembly 20 is provided with a conducting sheet adapting to the conducting sliding rail, and the conducting sheet is electrically connected to the second massage module 21; and the conducting sheet is capable of sliding in a reciprocating manner on the conducting sliding rail. During actual application, the conducting sliding rail and the conducting sheet can be made of copper, aluminum, iron, or other metal. At the same time, when the conducting sliding rail and the conducting sheet are communicated, a micro voltage less than a safety voltage to a human body, and a micro current exist.

In this way, during selling, by means of configuring several massage subassemblies 20, each massage subassembly 20 has a different massage function, so that a user can replace different massage subassemblies 20 to achieve different massage modes. At the same time, the conducting sliding rail is used to cause the massage subassembly 20 to be adjustably disposed on the stick body 10, so that a length from a front end of the stick body 10 to the massage subassembly 20 can be changed by sliding the massage subassembly 20 to meet usage needs of different users. Furthermore, when the massage subassembly 20 slides on the conducting sliding rail, the PCB 11 is still in stable electrical connection to the second massage module 21 in the massage subassembly 20, which ensures the working stability.

Specifically, the massage subassembly 20 has a connecting through hole 23 adapting to the stick body 10. An inner side surface of the connecting through hole 23 has a first silica gel layer 24. An outer side surface of the stick body 10 is provided with a second silica gel layer 15. When the massage subassembly 20 is arranged on the stick body 10, the first silica gel layer 24 and the second silica gel layer 15 are in contact with each other. It should be noted here that the outermost layers of the massage subassembly 20 and the stick body 10 are generally silica gel layers made of silica gel, namely the first silica gel layer 24 and the second silica gel layer 15. During use, the first silica gel layer 24 and the second silica gel layer 15 are in contact with each other, so that when the massage subassembly 20 is assembled on the stick body 10 and slides relative to the stick body, there is relatively high sliding friction resistance between them, thus implementing that the massage subassembly 20 can be stably positioned at any position on the conducting sliding rail (the stick body).

In one embodiment, two conducting sliding rails are provided, which are respectively defined as a first conducting sliding rail 141 and a second conducting sliding rail 142. Further, the first conducting sliding rail 141 and the second conducting sliding rail 142 are arranged on an outer circumferential side of the stick body 10 in a spacing manner.

Correspondingly, two conducting sheets are provided, which are respectively defined as a first conducting sheet 221 and a second conducting sheet 222. Further, the first conducting sheet 221 and the second conducting sheet 222 are arranged on an inner circumferential side of the connecting through hole 23 in a spacing manner. During assembling, the first conducting sheet 221 is in contact connection with the first conducting sliding rail 141, and the second conducting sheet 222 is in contact connection with the second conducting sliding rail 142. In this way, the second massage module 21 and the PCB 11 can form a complete control loop.

Further, the PCB 11 is electrically connected with a control button. The control button includes a button for controlling start, stop and work gears of the first massage module 12 and a button for controlling start, stop and work gears of the second massage module 21. Furthermore, the control button is preferably arranged at a rear end of the stick body 10, and the button is preferably provided with a button cap 16.

At the same time, when the massage subassembly 20 and the stick body 10 are assembled, the massage subassembly enters the stick body from the rear end of the stick body 10 to the front side.

In one embodiment, the first conducting sliding rail 141 and the second conducting sliding rail 142 each have a connecting recess 143 that is recessed towards the inner side. The first conducting sheet 221 and the second conducting sheet 222 each extend towards the inner side to form a connecting protrusion 223 adapting to the connecting recess 143. During assembling, the connecting protrusion 223 of the first conducting sheet 221 is located in the connecting recess 143 of the first conducting sliding rail 141, and the connecting protrusion 223 of the second conducting sheet 222 is located in the connecting recess 143 of the second conducting sliding rail 142.

Preferably, the stick body 10 includes a plastic inner housing and a silica gel outer sleeve 103. The silica gel outer sleeve 103 is sleeved on the outer side of the plastic inner housing. Further, the plastic inner housing has an accommodating cavity, and the PCB 11, the battery, and the first massage module 12 are all arranged in the accommodating cavity. The second silica gel layer 15 is formed on the silica gel outer sleeve 103. Generally, the plastic inner housing includes a first inner housing 101 and a second inner housing 102. The first inner housing 101 and the second inner housing 102 can be in threaded connection or fastened connection. Furthermore, the first inner housing 101 and the second inner housing 102 are connected to form the accommodating cavity.

In one embodiment, the plastic inner housing is provided with a mounting slot used for mounting the conducting sliding rail, and a position of the silica gel outer sleeve 103 corresponding to the mounting slot is provided with an avoiding slot, so that the conducting sliding rail is exposed from the outer side of the plastic outer sleeve 103.

In one embodiment, the first massage module 12 includes a first vibration module, and the first vibration module has a first vibration motor. Preferably, the first massage module 12 further includes a first heating module (not shown) used for heating the stick body 10.

In one embodiment, the second massage module 21 includes a second vibration module, and the second vibration module has a second vibration motor. Of course, the second massage module 21 may also include a second heating module (not shown) used for heating the massage subassembly 20; or a suction module (not shown).

The design point of the present disclosure is that the main advantages are that by means of configuring several massage subassemblies, each massage subassembly has a different massage function, so that a user can replace different massage subassemblies to achieve different massage modes. At the same time, the conducting sliding rail is used to cause the massage subassembly to be adjustably disposed on the stick body, so that a length from a front end of the stick body to the massage subassembly can be changed by sliding the massage subassembly to meet usage needs of different users.

Secondly, the ingenious design of the conducting sliding rails and the conducting sheets can maintain effective connection between the massage subassemblies and the PCB. At the same time, by the corresponding arrangement of the first silica gel layer and the second silica gel layer, the working stability of the massage subassemblies and the stick body is well guaranteed.

The above-mentioned examples are only preferred embodiments of the present disclosure and do not limit the technical scope of the present disclosure. Therefore, any subtle modifications, equivalent changes or alterations made to the above embodiments on the basis of the technical substance of the present disclosure shall still fall within the scope of the technical solutions of the present disclosure.

What is claimed is:

1. A massage device with replaceable massage subassemblies, comprising a stick body and at least one massage subassembly arranged on the stick body in a separating manner, wherein a printed circuit board (PCB), a first massage module, and a power supply are arranged in the stick body; the PCB is electrically connected to the first massage module and the power supply; a second massage module is arranged in each massage subassembly;

the stick body is provided with a conducting sliding rail disposed in a lengthwise direction of the stick body, and the PCB is electrically connected to the conducting sliding rail;

each massage subassembly is provided with a conducting sheet adapting to the conducting sliding rail, and the conducting sheet is electrically connected to the second massage module; and the conducting sheet is capable of sliding in a reciprocating manner on the conducting sliding rail.

2. The massage device with replaceable massage subassemblies according to claim 1, wherein the massage subassembly has a connecting through hole adapting to the stick body; an inner side surface of the connecting through hole has a first silica gel layer; an outer side surface of the stick body is provided with a second silica gel layer; and when the massage subassembly is arranged on the stick body, the first silica gel layer and the second silica gel layer are in contact with each other.

3. The massage device with replaceable massage subassemblies according to claim 2, wherein two conducting sliding rails are provided, which are respectively defined as a first conducting sliding rail and the second conducting sliding rail; the first conducting sliding rail and the second conducting sliding rail are arranged on an outer circumferential side of the stick body in a spacing manner;

correspondingly, two conducting sheets are provided, which are respectively defined as a first conducting sheet and a second conducting sheet; the first conducting sheet and the second conducting sheet are arranged on an inner circumferential side of the connecting through hole in a spacing manner; and during assembling, the first conducting sheet is in contact connection with the first conducting sliding rail, and the second conducting sheet is in contact connection with the second conducting sliding rail.

4. The massage device with replaceable massage subassemblies according to claim 2, wherein the stick body comprises a plastic inner housing and a silica gel outer sleeve; the silica gel outer sleeve is sleeved on the outer side of the plastic inner housing;

the plastic inner housing has an accommodating cavity, and the PCB, the battery, and the first massage module are all arranged in the accommodating cavity;

and the second silica gel layer is formed on the silica gel outer sleeve.

5. The massage device with replaceable massage subassemblies according to claim 2, wherein the plastic inner housing is provided with a mounting slot used for mounting the conducting sliding rail, and a position of the silica gel outer sleeve corresponding to the mounting slot is provided with an avoiding slot.

6. The massage device with replaceable massage subassemblies according to claim 2, wherein the PCB is electrically connected with a control button.

7. The massage device with replaceable massage subassemblies according to claim 1, wherein the conducting sliding rail has a connecting recess that is recessed towards the inner side, and the conducting sheet has a connecting protrusion adapting to the connecting recess.

8. The massage device with replaceable massage subassemblies according to claim 1, wherein the first massage module comprises a first vibration module, and the first vibration module has a first vibration motor.

9. The massage device with replaceable massage subassemblies according to claim 8, wherein the first massage module further comprises a heating module used for heating the stick body.

10. The massage device with replaceable massage subassemblies according to claim 1, wherein the second massage module comprises a second vibration module, and the second vibration module has a second vibration motor.

* * * * *